(12) United States Patent
Matsumoto et al.

(10) Patent No.: US 8,980,449 B2
(45) Date of Patent: Mar. 17, 2015

(54) MAGNETIC RECORDING MEDIUM, MANUFACTURING METHOD, AND USE THEREOF

(71) Applicant: Fuji Electric Co., Ltd., Kawasaki (JP)

(72) Inventors: Takako Matsumoto, Matsumoto (JP); Takeshi Watanabe, Penang (MY)

(73) Assignee: Fuji Electric Co., Ltd., Kawasaki-Shi (JP)

( * ) Notice: Subject to any disclaimer, the term of this patent is extended or adjusted under 35 U.S.C. 154(b) by 0 days.

(21) Appl. No.: 14/118,478

(22) PCT Filed: Nov. 2, 2012

(86) PCT No.: PCT/JP2012/007058
§ 371 (c)(1),
(2) Date: Nov. 18, 2013

(87) PCT Pub. No.: WO2013/111223
PCT Pub. Date: Aug. 1, 2013

(65) Prior Publication Data
US 2014/0212692 A1    Jul. 31, 2014

(30) Foreign Application Priority Data

Jan. 27, 2012    (JP) ................ 2012-015247

(51) Int. Cl.
*G11B 5/66*       (2006.01)
*G11B 5/725*      (2006.01)
*C10M 169/04*     (2006.01)

(52) U.S. Cl.
CPC ............. *G11B 5/725* (2013.01); *C10M 169/04* (2013.01); *C10M 2213/0606* (2013.01); *C10M 2223/08* (2013.01); *C10N 2240/204* (2013.01)
USPC ...................... 428/835.8; 427/131

(58) Field of Classification Search
CPC ........................................... G11B 5/725
USPC ...................................... 428/835.8
See application file for complete search history.

(56) References Cited

U.S. PATENT DOCUMENTS

| | | | |
|---|---|---|---|
| 2008/0020171 A1* | 1/2008 | Wakabayashi et al. ...... | 428/65.8 |
| 2009/0291325 A1 | 11/2009 | Xu et al. | |
| 2010/0136371 A1 | 6/2010 | Shimizu et al. | |
| 2010/0239887 A1 | 9/2010 | Kobayashi | |

(Continued)

FOREIGN PATENT DOCUMENTS

| | | |
|---|---|---|
| CN | 1989228 A | 6/2007 |
| JP | 2009-270093 A | 11/2009 |

(Continued)

OTHER PUBLICATIONS

Tani, H. et al., "Lubricant Pickup of Ultra-Thin PFPE Lubricants With Different Backbone Structures", IEEE Tranactions on Magnetics, vol. 47, No. 7, pp. 1837-1841, Jul. 2011.

*Primary Examiner* — Holly Rickman
(74) *Attorney, Agent, or Firm* — Rabin & Berdo, P.C.

(57) ABSTRACT

A magnetic recording medium includes a nonmagnetic substrate provided on which are, in the order recited; an underlayer; a magnetic layer; a protective layer comprised of carbon; and a lubricating layer composed of a lubricant mixture composed of a lubricant represented by Formula (I) below $$R_f = \text{---}R^1\text{---}O(CF_2CF_2CF_2O)_m\text{---}R^2\text{---},$$

where m is an integer equal to or greater than 1, and $R^1$ and $R^2$ are divalent straight chains consisting of both $\text{---}CH_2CF_2\text{---}$ or both $\text{---}CH_2CF_2CF_2\text{---}$; and a lubricant represented by Formula (II) below $$R_{f2} = \text{---}CH_2CF_2O(CF_2CF_2O)_p(CF_2O)_qCF_2CH_2\text{---},$$

where p and q are integers equal to or greater than 0, provided that p =q =0 is excluded. A method of manufacturing the magnetic recording medium is likewise disclosed.

8 Claims, 7 Drawing Sheets

(56) References Cited

U.S. PATENT DOCUMENTS

| | | |
|---|---|---|
| 2011/0143165 A1 | 6/2011 | Kobayashi et al. |
| 2012/0021253 A1 | 1/2012 | Nakata et al. |
| 2013/0083422 A1* | 4/2013 | Ooeda et al. .................... 360/75 |

FOREIGN PATENT DOCUMENTS

| | | |
|---|---|---|
| JP | 2009-542805 A | 12/2009 |
| JP | 2010-108583 A | 5/2010 |
| JP | 2010168512 A | 8/2010 |
| JP | 2010-248463 A | 11/2010 |
| WO | WO-2006/009057 A1 | 1/2006 |
| WO | WO-2007/043450 A1 | 4/2007 |
| WO | WO-2008/140121 A1 | 11/2008 |
| WO | WO-2009066784 A1 | 5/2009 |
| WO | WO-2009122988 A1 | 10/2009 |
| WO | WO-2010/027096 A1 | 3/2010 |

* cited by examiner

MAGNETIC RECORDING MEDIUM, MANUFACTURING METHOD, AND USE THEREOF

BACKGROUND OF THE INVENTION

1. Field of the Invention

The present invention relates to a magnetic recording medium and a manufacturing method thereof, and more particularly to a magnetic recording medium suitable for external storage devices of computers and a manufacturing method thereof. More specifically, the present invention relates to a magnetic recording medium which has a lubricating layer including a perfluoropolyether compound having a perfluorotrimethyleneoxy repeating unit in the main chain and a cyclic triphosphazene structure, and which makes it possible to reduce the head flying height, and also to a manufacturing method thereof. The present invention also relates to a method for reducing the head flying height and improving the electromagnetic conversion property of a magnetic recording medium by changing the mixing ratio of the perfluoropolyether compound in the lubricating layer.

2. Background of the Related Art

In order to improve durability and reliability of a magnetic recording medium (in particular, a magnetic disk) and also to reduce a friction force generated between the protective layer of the magnetic recording medium and the head, it is necessary to impart a lubricating property to the magnetic recording medium. For example, a lubricating property has been improved by forming a lubricating layer including a perfluoropolyether lubricant having a polar end group such as a hydroxyl group in a molecule on a diamond-like carbon (DLC) film that is typically used as a protective layer for magnetic recording media.

Further, Patent Document 1, WO 2007/043450, describes the feature of forming a lubricating layer by using a perfluoropolyether lubricant represented by Formula (V) and having a cyclic triphosphazene structure in a molecule with the objective of improving the adhesion to a magnetic recording medium and reducing decomposition ability. Further, Patent Document 2, WO 2006/009057, describes the feature of forming a lubricating layer by using a mixture of a compound with p=1 and a compound with p=2 in Formula (V). Patent Document 3, WO 2008/140121, describes the feature of forming a lubricating layer by using a perfluoropolyether lubricant having a cyclic triphosphazene structure with a different number of perfluoropolyether side chains.

C1

$R_{f2} = $ —$CH_2CF_2O(CF_2CF_2O)_p(CF_2O)_qCF_2CH_2$— p = 1-3

A lubricating layer formed on a protective layer can be assumed to be constituted by two layers. The first layer is a layer bonded to the protective layer (referred to hereinbelow as "bonded lubricating layer"), and the other is a layer present on the bonded lubricating layer and not bonded to the protective layer (referred to hereinbelow as "free lubricating layer"). From the standpoint of improving the properties, it is preferred that the lubricating layer have a structure with a thin free lubricating layer and a thick bonded lubricating layer.

However, following recent trend to increase in density of magnetic recording media (magnetic disks), more stringent requirements have been placed on the lubricant properties. In order to meet such requirements, it is important to ensure compatibility of heads and magnetic disks, and a lubricant material is needed that will make it possible to bring the head close to the magnetic disk (to reduce the head flying height).

In addition, the number of cases in which the recently developed hard disk drives are used not only for personal computers that are used indoors, but also in outdoor environment such as portable devices and car navigation systems, has grown. When the hard disk drive is used in an outdoor environment, in particular, a high-temperature and high-humidity environment, such environment makes it difficult for a magnetic head slider to levitate. This problem is apparently attributable to cohesion of moisture contained in high-humidity air. Therefore, the problem of disposing a lubricant more accurately on the surface of a magnetic recording medium (magnetic disk) used in a hard disk drive is of major importance.

In order to solve this problem, it is important to reduce the height of the molecule and control the orientation of the lubricant on the protective film. Fomblin (trade name) Z-dol (Formula (III)) and Fomblin (trade name) Z-tetraol (Formula (IV)) lubricants, which are presently typically used for magnetic recording media, are perfluoropolyether compounds having a hydroxyl group at either end (in the formulas, p and q are integers equal to or greater than 0, but the case in which p=q=0 is excluded).

C2

$R_{f3} = $ —$CH_2CF_2O(CF_2CF_2O)_p(CF_2O)_qCF_2CH_2$— .

The specific feature of the compound represented by Formula (III) and/or Formula (IV) is that when a lubricating layer is formed by coating on a protective layer, C, F, and O contained in the molecular structure are arranged randomly. This specific feature is affected by the molecular structure (hydroxyl group present at each end) represented by Formula (III) or Formula (IV). Due to random arrangement, active oxygen atoms face the head side (front surface side), rather than the protective layer side. As a result, the adsorption of contaminating substances is enhanced and the adsorptivity on the head slider surface is increased. Such phenomena cause a variation in head flying property.

Therefore, in order to decrease the head flying height and improve the flying stability, a lubrication material is needed that has a chemical structure different from that represented by Formula (III) and/or Formula (IV). In this regard, Non-Patent Document 1, IEEE Transactions on Magnetics, "Lubricant Pickup of Ultra-Thin PFPE Lubricants with Different Backbone Structures", Vol. 47, No. 7, July, 2011, pp. 1837-1841, reports that a lubricant pickup by the head is different when a lubricant is used that has the structure represented by Formula (I) which has a different main-chain repeating unit.

$$R_f = \text{---CH}_2\text{CF}_2\text{CF}_2\text{O(CF}_2\text{CF}_2\text{CF}_2\text{O)}_m\text{CF}_2\text{CF}_2\text{CH}_2\text{---}$$

In the case of conventional lubricant containing the compound represented by Formula (III) and/or Formula (IV), the head flying property has been improved by optimizing the additive to be added and the mixing ratio thereof, the total film thickness of the lubricating layer, and the bonded ratio. However, the problem is that when such means as the decrease in the total film thickness and/or increase in the bonded ratio is used to improve the head flying property, other properties (durability and the like) of the magnetic recording medium (in particular, the lubricating layer) are degraded.

An objective of the present invention is to provide a magnetic recording medium that can realize high electromagnetic conversion property by reducing the head flying height, without degrading other properties, and also to provide a manufacturing method thereof.

SUMMARY OF THE INVENTION

A magnetic recording medium according to a first embodiment of the present invention, comprises: a nonmagnetic substrate and provided thereon, in the order recited; an underlayer; a magnetic layer; a protective layer comprised of carbon; and a lubricating layer comprised of a lubricant mixture comprising a lubricant represented by Formula (I) below $$R_f = \text{---R}^1\text{---O(CF}_2\text{CF}_2\text{CF}_2\text{O)}_m\text{---R}^2\text{---},$$

where m is an integer equal to or greater than 1, and $R^1$ and $R^2$ are divalent straight chains consisting of both —CH$_2$CF$_2$—or both —CH$_2$CF$_2$CF$_2$—; and
a lubricant represented by Formula (II) below $$R_{f2} = \text{---CH}_2\text{CF}_2\text{O(CF}_2\text{CF}_2\text{O)}_p(\text{CF}_2\text{O)}_q\text{CF}_2\text{CH}_2\text{---},$$

where p and q are integers equal to or greater than 0, provided that p=q=0 is excluded. The lubricant represented by Formula (II) is described in Patent Documents 1 and 2.

A method of manufacturing a magnetic recording medium according to a second embodiment of the present invention comprises forming an underlayer on a non-magnetic substrate; laminating a magnetic layer on the underlayer; laminating a protective layer comprised of carbon on the magnetic layer; and forming a lubricating layer by laminating, on the protective layer, a lubricant mixture comprised of a lubricant represented by Formula (I) below $$R_f = \text{---R}^1\text{---O(CF}_2\text{CF}_2\text{CF}_2\text{O)}_m\text{---R}^2\text{---},$$

where m is an integer equal to or greater than 1, and $R^1$ and $R^2$ are divalent straight chains consisting of both —CH$_2$ CF—or both —CH$_2$ CF$_2$CF$_2$—; and
a lubricant represented by Formula (II) below $$R_{f2} = \text{---CH}_2\text{CF}_2\text{O(CF}_2\text{CF}_2\text{O)}_p(\text{CF}_2\text{O)}_q\text{CF}_2\text{CH}_2\text{---},$$

where p and q are integers equal to or greater than 0, provided that p=q=0 is excluded.

A method according to a third embodiment of the present invention is a method for reducing flying height of a head and improving an electromagnetic conversion property in a magnetic recording medium, comprising: providing the magnetic recording medium described above; and changing at least one of a usage amount of the lubricant represented by Formula (I) and a mixing ratio of the lubricant represented by Formula (I) and the lubricant represented by Formula (II).

In the magnetic recording medium in accordance with the present invention, a lubricating layer constituted by a mixture of a compound represented by Formula (I) that includes a —(CF$_2$CF$_2$CF$_2$O)$_m$— structure in the main chain and the compound represented by Formula (II) is provided instead of the lubricating layer including a generally used lubricant having a —(CF$_2$CF$_2$O)$_m$(CF$_2$O)$_n$— structure in the main chain, thereby making it possible to reduce the head flying height and realize a magnetic recording medium surface with high durability. Further, it is found out that this effect is made more prominent by setting the usage amount of the lubricant represented by Formula (II) (see Patent Documents 1 and 2) equivalent to the film thickness ranging from 0 Å to 3 Å. By reducing the head flying height, it is possible to improve the electromagnetic conversion property of the magnetic recording medium.

DETAILED DESCRIPTION OF THE INVENTION

The magnetic recording medium according to the first embodiment of the present invention includes a non-magnetic substrate, an underlayer, a magnetic layer, a protective layer including carbon, and a lubricating layer.

Various substrates with a smooth surface that are known in the related art can be used as the non-magnetic substrate. For example, a NiP-plated Al alloy (Al—Mg or the like), reinforced glass, and crystallized glass, which are used in the conventional magnetic recording media, can be used as the non-magnetic substrate.

In the present invention, the underlayer may be a soft magnetic layer for concentrating a magnetic flux generated by the head in the magnetic layer when perpendicular magnetic recording is performed, an intermediate layer for forming a magnetic layer having good magnetic properties by controlling the orientation of the magnetic layer, a seed layer for improving the orientation ability and adhesivity of the intermediate layer, or a laminated structure thereof.

A soft magnetic underlayer can be formed by using a crystalline material such as FeTaC and Sendust (FeSiAl) alloy, or an amorphous material including a Co alloy such as CoZrNb and CoTaZr.

The intermediate layer is used for controlling the crystal grain size and crystal orientation of the magnetic layer and preventing magnetic coupling between the soft magnetic underlayer (when such is present) and the magnetic layer. Therefore, it is preferred that the intermediate layer be non-magnetic. The crystal structure of the intermediate layer is appropriately selected according to the material of the magnetic layer. For example, when the magnetic layer positioned directly thereabove is formed from a material based on Co and having a hexagonal closely packed (hcp) structure, the intermediate layer can be formed using a material having a hcp or a face-centered cubic (fcc) structure. Alternatively, the intermediate layer may have a non-crystalline structure. Examples of the preferred materials for forming the intermediate layer include Ru, Re, Rh, Pt, Pd, Ir, Ni, Co, and alloys thereof.

The seed layer is used with the object of ensuring adhesion between the intermediate layer and the non-magnetic substrate or soft magnetic underlayer (when such is present) and controlling the orientation of the intermediate layer. The seed layer can be formed using NiW, Ta, Cr, or an alloy including Ta and/or Cr. The seed layer may also have a layered structure constituted by a plurality of layers including the aforementioned material.

In the present invention, the magnetic layer can be formed using a crystalline magnetic material. The crystalline magnetic materials that can be used include ferromagnetic materials such as alloys including at least Co or Pt (for example, Co—Cr—Ta, Co—Cr—Pt). In this case, the axis of easy magnetization of the ferromagnetic material should be oriented in the direction in which magnetic recording is performed. In order to perform perpendicular magnetic recording, the axis of easy magnetization of the material of the magnetic layer (c-axis of the hcp structure) should be oriented in the direction perpendicular to the surface of the magnetic recording medium (that is, to the main plane of the non-magnetic substrate). Alternatively, the magnetic layer may have a structure in which magnetic crystal grains are separated by a non-magnetic body (the so-called granular structure). In this case, it is preferred that the magnetic crystal grains have a columnar shape with a diameter of several nanometers. It is preferred that the non-magnetic body have a subnanometer thickness. The materials for forming magnetic crystal grains include alloys based on magnetic elements such as Co, Fe, and Ni. It is preferred that materials for forming the magnetic crystal grains include materials obtained by adding a metal such as Cr, B, Ta, and W to a CoPt alloy. Meanwhile, the materials for forming the non-magnetic body include oxides or nitrides of Si, Cr, Co, Ti, or Ta.

In the present invention, the carbon materials for forming the protective layer include amorphous carbon and diamond-like carbon (DLC).

The underlayer, magnetic layer, and protective layer including carbon are formed using means typically used in the related art.

The lubricating layer of the magnetic recording medium in accordance with the present invention can be formed using a mixture of a lubricant represented by Formula (I)

[C10]

$R_f = $ —$CH_2CF_2CF_2O(CF_2CF_2CF_2O)_m CF_2CF_2CH_2$—

(in the formula, m is an integer equal to or greater than 1), which includes a perfluorotrimethylene repeating unit (—$CF_2CF_2CF_2O$—) in the main chain and has a hydroxyl group (—OH) at each end, and a lubricant represented by Formula (II)

[C11]

$R_{f2} = $ —$CH_2CF_2O(CF_2CF_2O)_p(CF_2O)_q CF_2CH_2$—

(in the formula, p and q are integers equal to or greater than 0; the case in which p=q=0 is excluded). As an example of the lubricant represented by Formula (I) includes D4OH (manufactured by MORESCO), which is described in Non-Patent Document 1. As an example of the lubricant represented by Formula (II) includes ADOH (manufactured by MORESCO).

The lubricating layer of the magnetic recording medium in accordance with the present invention is desirably constituted only by the mixture of the lubricant represented by Formula (I) and the lubricant represented by Formula (II). In this case the added amount of the lubricant represented by Formula (II) is desirably set equivalent to a film thickness of 0.3 Å to 3 Å.

The lubricating layer of the magnetic recording medium in accordance with the present invention can be formed by a coating method using a solution including, as a solid component, a mixture of the lubricant represented by Formula (I) and the lubricant represented by Formula (II). The coating method can be a dipping method. Post-treatment such as UV treatment and tape varnish treatment may be implemented after the lubricating layer has been formed.

The magnetic recording medium in accordance with the present invention will be explained below in greater detail on the basis of examples therefor. However, the present invention is not limited to the below-described examples and can be variously changed without departing from the essence thereof.

EXAMPLES

Example 1

A magnetic disk substrate with a diameter of 65 mm that was covered with a protective layer of diamond-like carbon with a thickness of 2.0 nm was fabricated by a plasma CVD method. A mixture of D4OH represented by Formula (I) and ADOH represented by Formula (II) was dissolved in a Vertrel XF (manufactured by Du Pont-Mitsui Fluorochemicals Co., Ltd.) solvent, and a lubricating layer coating liquid was produced. A magnetic disk substrate was immersed into the lubricating layer coating solution, pulled up at a rate of 1.5 mm/sec and then dried. The dry coating film was then UV treated using a UV lamp with an emission peak wavelength of 185 nm/254 nm and an output of 200 W and the lubricating layer was formed. In this case, the concentration of D4OH in the lubricating layer coating liquid containing only D4OH and the concentration of D4OH and ADOH in the lubricating layer coating liquid using the mixture were adjusted such that the total film thickness of the obtained lubricating layer was 7 Å to 10 Å and the film thickness of ADOH, which was an additive, was 0.3 Å to 3.0 Å. Further, the lubricating layer was formed such that the thickness of the bonded lubricant was about 6.00 Å and the bonded ratio was 75.0%.

The "total film thickness of the lubricating layer" in the present invention is the thickness of the lubricating layer at the time the lubricating layer is formed, and it is measured with a Fourier transform IR spectrophotometer (FT-IR). The "film thickness of the bonded lubricating layer" in the present invention is the thickness of the layer of the lubricant that is actually bonded to the carbon surface of the protective layer. More specifically, the "film thickness of the bonded lubricating layer" is the thickness of the lubricating layer after the obtained lubricating layer has been washed using Vertrel XF (manufactured by Du Pont-Mitsui Fluorochemicals Co., Ltd.), and it is measured with a Fourier transform IR spectrophotometer (FT-IR).

The degree of bonding of a lubricant with functional groups present on the carbon surface of a protective layer is typically represented by the ratio of the lubricating layer thickness after washing with a fluorine-containing solvent to the lubricating layer thickness prior to washing with the fluorine-containing solvent, and the percentage value thereof is called "bonded ratio". In the present invention, the "bonded ratio" is determined by the following formula by using the film thickness prior to washing with the aforementioned Vertrel XF (manufactured by Du Pont-Mitsui Fluorochemicals Co., Ltd.) (that is, the total film thickness of the lubricating layer) to the film thickness after the washing (that is, the film thickness of the bonded lubricating layer).

Math. 1:

Bonded ratio (%)=[(Film thickness of lubricating layer after washing)/(Film thickness of lubricating layer prior to washing)]×100

Comparative Example 1

A lubricating layer was formed by repeating the procedure of Example 1, except that the lubricating layer coating liquid was formed using a mixture of Fomblin (trade name) Z-tetraol (Formula (IV)) and ADOH. The concentrations of the Fomblin (trade name) Z-tetraol and ADOH in the coating liquid were adjusted such that the total film thickness of the obtained lubricating layer was 8.0 Å and the film thickness of ADOH, which was the additive, was 2.0 Å. Further, the lubricating layer was formed such that the thickness of the bonded lubricating layer was about 6.00 Å and the bonded ratio was 75.0%.

Comparative Example 2

A lubricating layer was formed by repeating the procedure of Example 1, except that ADOH was not used. The concentrations of the D4OH in the coating liquid were adjusted such that the total film thickness of the obtained lubricating layer was 9.0 Å. Further, the lubricating layer was formed such that the thickness of the bonded lubricating layer was about 6.00 Å and the bonded ratio was 75.0%.

Evaluation

Figure 1:
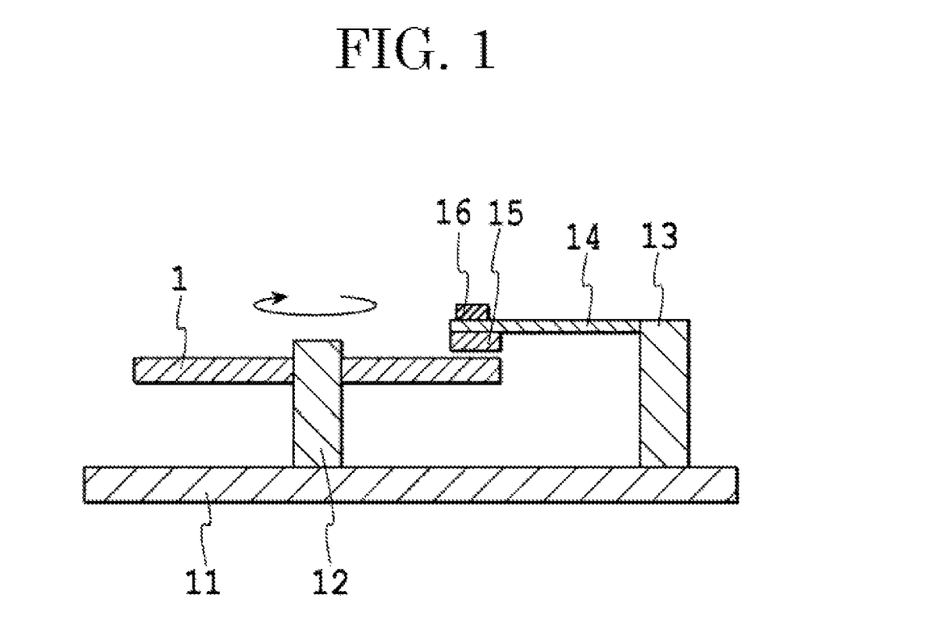
FIG. 1 is a schematic diagram of a device for evaluating the head flying height of a magnetic recording medium.

1. Low Flying Height Property:

A flying height limit was measured using RQ7800 (manufactured by Hitachi) which is shown schematically in FIG. 1. Initially, a magnetic recording medium 1 having a lubricating layer formed thereon was mounted on a spindle motor 12 mounted on a support section 11. Then, the magnetic recording medium 1 was rotated and a 30% size glide head 15 and a PZT sensor 16 (manufactured by GW Co.) at the distal end of an arm 14 attached to an arm support section 13 were caused to take off above the magnetic recording medium. In this state, the circumferential speed of the glide head 15 was gradually decreased by controlling the spindle motor, and the circumferential speed at which the glide head 15 dropped down was measured and then determined a flying height limit. The results obtained are shown in Table 1 and FIG. 2.

TABLE 1

Evaluation of flying height

| | Lubricant material | Total film thickness (A) | ADOH film thickness (A) | Flying height limit (nm) |
|---|---|---|---|---|
| Comparative Example 1 | Fomblin Z-tetraol + ADOH | 8.29 | 2.31 | 2.41 |
| Comparative Example 2 | D4OH | 9.21 | 0.00 | 2.33 |
| Example 1 | D4OH + ADOH | 9.07 | 0.32 | 2.33 |
| | D4OH + ADOH | 8.48 | 0.79 | 2.33 |
| | D4OH + ADOH | 8.72 | 1.43 | 2.33 |
| | D4OH + ADOH | 9.08 | 3.02 | 2.33 |
| | D4OH + ADOH | 7.49 | 1.51 | 2.32 |
| | D4OH + ADOH | 7.69 | 2.86 | 2.32 |
| | D4OH + ADOH | 9.42 | 1.48 | 2.36 |
| | D4OH + ADOH | 6.51 | 1.46 | 2.29 |
| | D4OH + ADOH | 6.11 | 3.05 | 2.29 |

Figure 2:
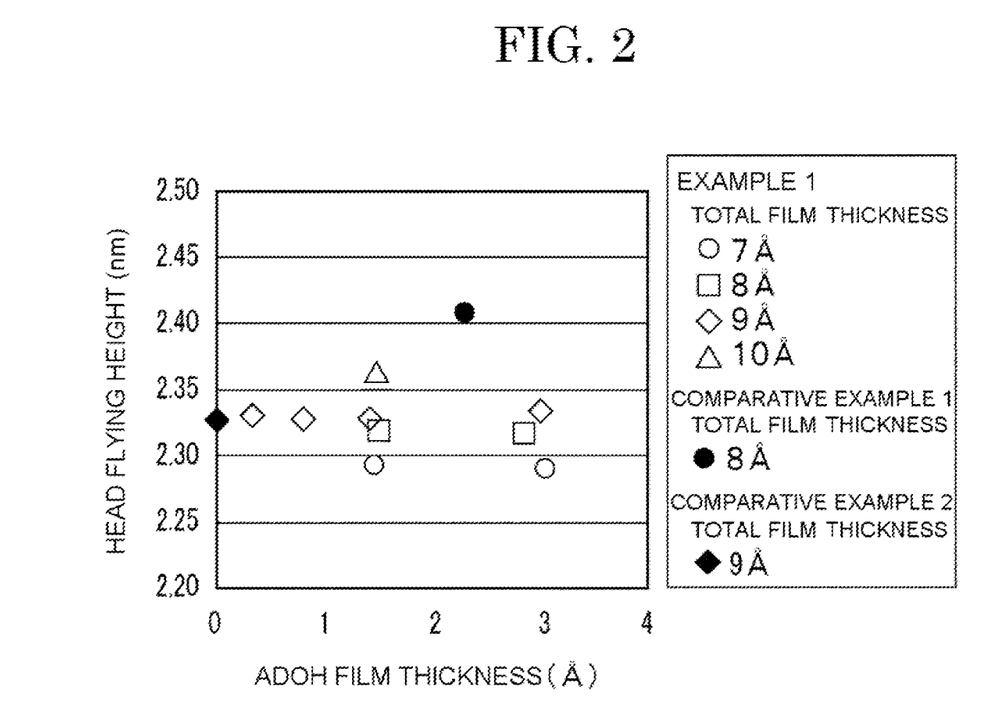
FIG. 2 is a graph showing the relationship between the added amount of ADOH and the head flying height in Example 1, Comparative Example 1, and Comparative Example 2.

The flying height limit value obtained for the sample of Comparative Example 2 that used D4OH including a —$(CF_2CF_2CF_2O)_m$— structure in the main chain and the sample of Example 1 using the mixture of D4OH and ADOH was lower than that obtained for the sample of Comparative Example 1 using Fomblin (trade name) Z-tetraol including a —$(CF_2CF_2O)_m(CF_2O)_n$— structure in the main chain. The dependence of the flying height limit value on the added amount of ADOH, which was an additive, and the dependence of the flying height limit value on the total film thickness of the lubricating layer were not observed. However, as a result of using D4OH or the mixture of D4OH and ADOH, the flying height limit value was improved by about 2% to about 5%.

Figure 3:
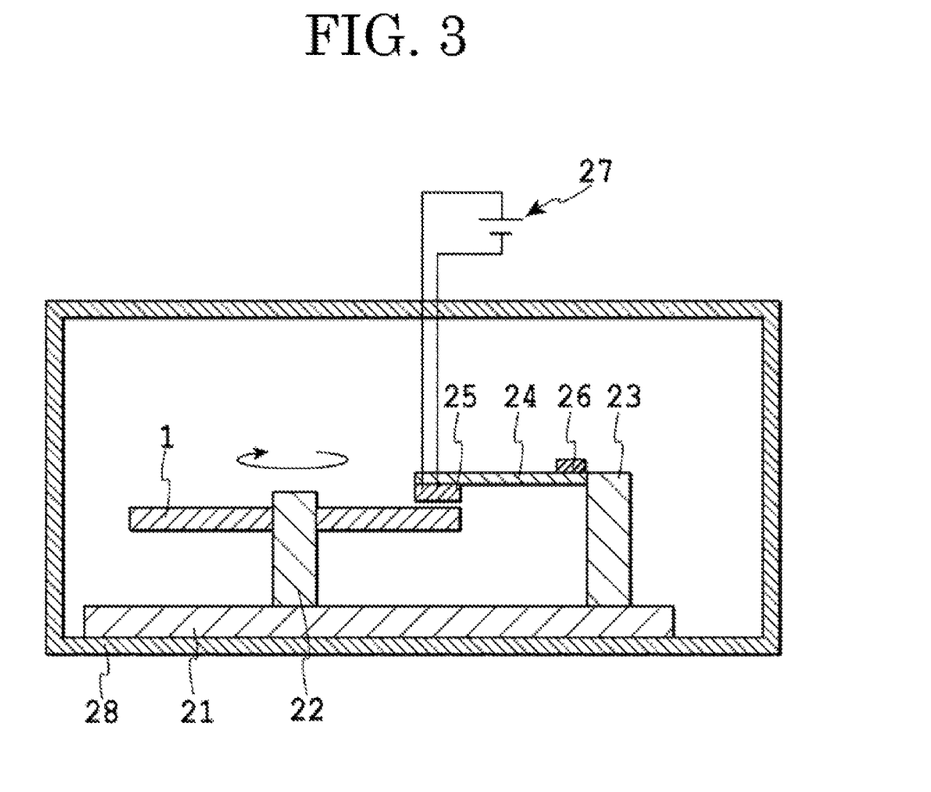
FIG. 3 is a schematic diagram of a device for evaluating the head flying height of a magnetic recording medium.

2. Low Flying Height Property:

As shown schematically in FIG. 3, by using VENA manufactured by VENA Co., a program head 25 was heated with a heater (not shown in the figure), the element portion of the head was thermally expanded, and the element portion of the program head 25 was caused to protrude till the element portion came into contact with the magnetic recording medium 1. The protrusion of the element portion reduced the distance (flying height) between the program head 25 and the magnetic recording medium 1. Stable flying of the program head 25 above the lubricating layer was maintained even when the protrusion of the element portion increased. A test was conducted by using drive conditions such as the revolution speed of the magnetic recording medium and the initial (when no power was applied) head flying height as the HDD usage conditions. A contact point was detected with an acoustic emission (AE) sensor 26 at the attachment portion of the program head 25, and the power applied at this time (touch-down power, TD power) was taken as an indicator of the low flying height property. Where the detection of the contact is delayed (TD power is large), a larger amount of power can be applied to the heater and the protrusion amount of the element portion increases. Therefore, the distance between the program head 25 and the magnetic recording medium is decreased and low flying height is made possible. The results obtained are shown in Table 2 and FIG. 4.

TABLE 2

Evaluation of flying height

| | Lubricant material | Total film thickness (A) | ADOH film thickness (A) | TD power (mV) |
|---|---|---|---|---|
| Comparative Example 1 | Fomblin Z-tetraol + ADOH | 8.29 | 2.31 | 42.39 |
| Comparative Example 2 | D4OH | 9.21 | 0.00 | 47.32 |
| Example 1 | D4OH + ADOH | 9.07 | 0.32 | 48.65 |
| | D4OH + ADOH | 8.48 | 0.79 | 48.79 |
| | D4OH + ADOH | 8.72 | 1.43 | 47.27 |
| | D4OH + ADOH | 9.08 | 3.02 | 46.65 |
| | D4OH + ADOH | 7.49 | 1.51 | 47.63 |
| | D4OH + ADOH | 7.69 | 2.86 | 47.17 |
| | D4OH + ADOH | 9.42 | 1.48 | 47.11 |
| | D4OH + ADOH | 6.51 | 1.46 | 49.19 |
| | D4OH + ADOH | 6.11 | 3.05 | 48.51 |

Figure 4:
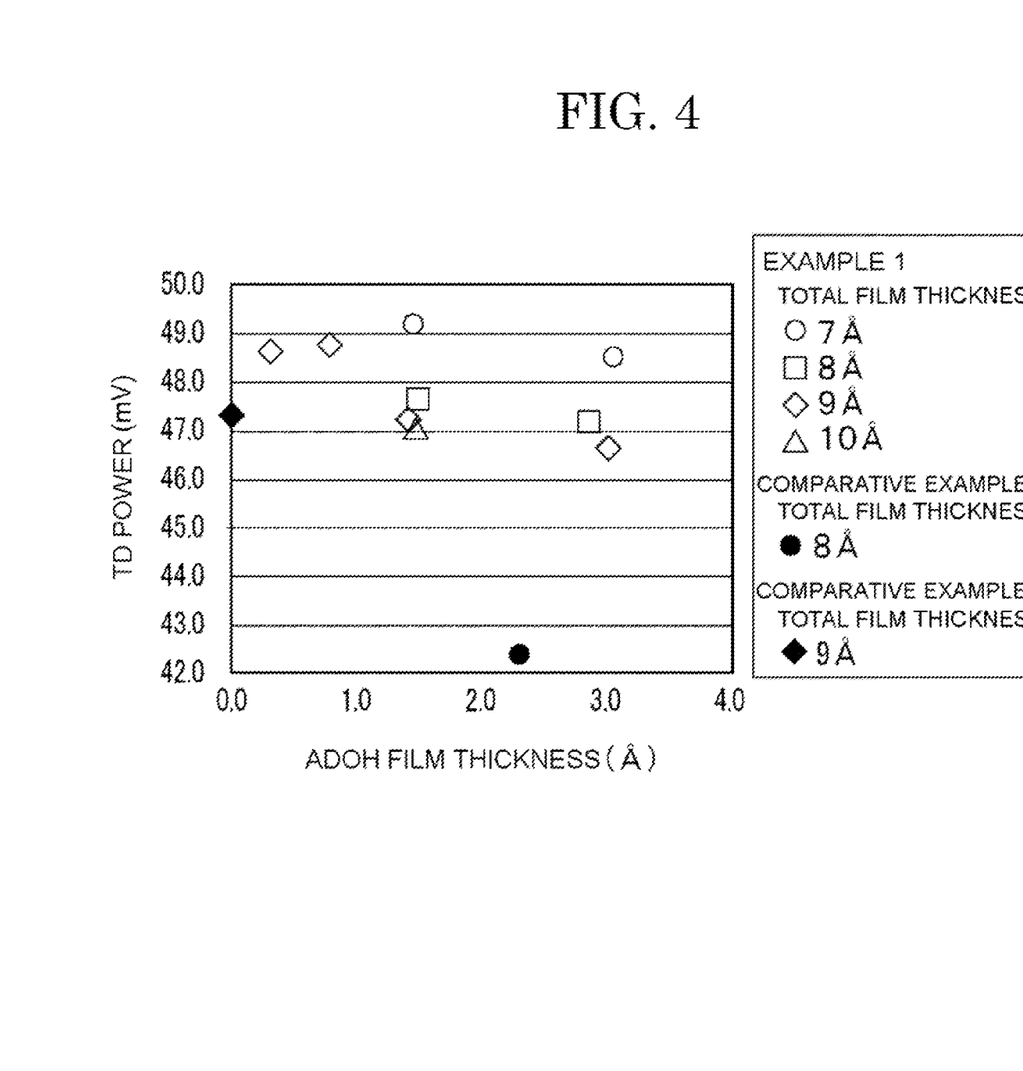
FIG. 4 is a graph showing the relationship between the added amount of ADOH and the TD power in Example 1, Comparative Example 1, and Comparative Example 2.

The results in Table 2 and FIG. 4 indicate that the power that can be applied to the heater heating the head in the case of the mixed sample of D4OH and ADOH is larger than that in the case of a mixed sample of Fomblin (trade name) Z-tetraol and ADOH of Comparative Example 1. The dependence of TD power on the total film thickness was observed, and the amount of power that could be applied to the heater increased advantageously with the decrease in film thickness. Further, good result was obtained in the samples where the added amount of ADOH was small.

Figure 5:
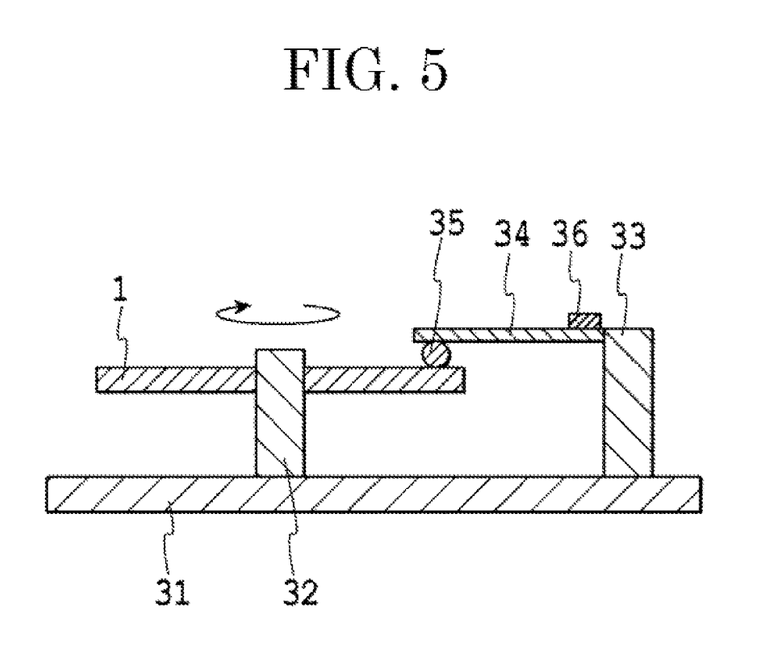
FIG. 5 is a schematic diagram of a device for evaluating the durability of a magnetic recording medium.
Figure 6:
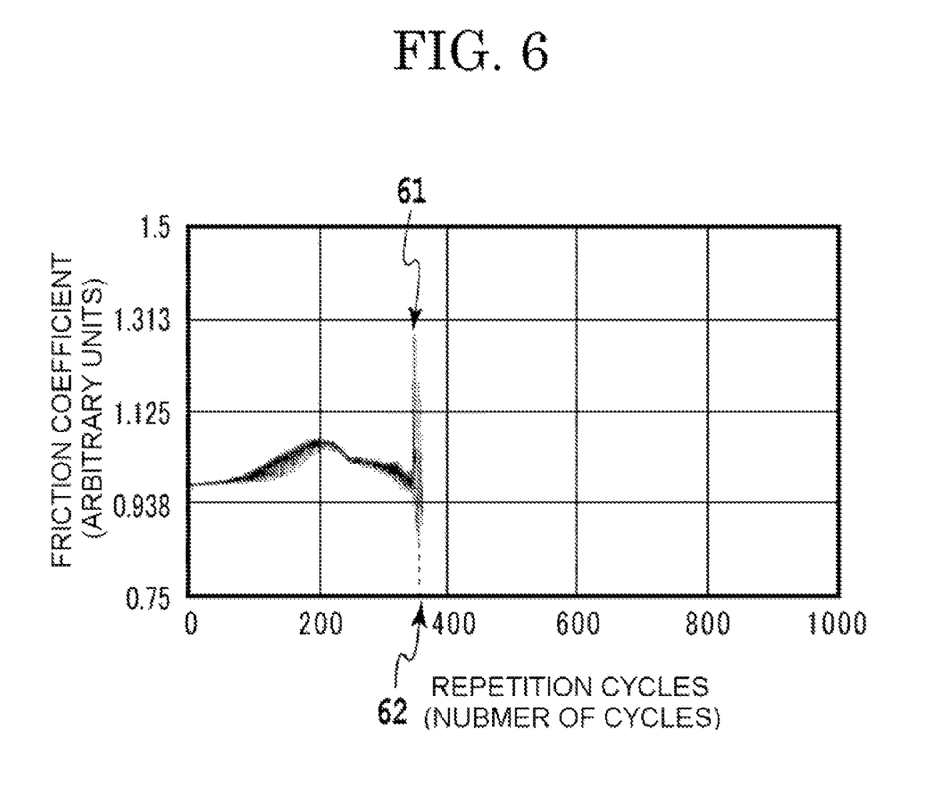
FIG. 6 is a graph illustrating a criterion for determining a breaking point.

3. Durability Characteristic:

Durability was evaluated by using a friction player (FPR-2100) manufactured by RHESCA and shown schematically in FIG. 5. The evaluation method is called POD. A load of 30 gf (about 0.29 N) was applied to an $Al_2O_3$—TiC ball 35 (disposed at the distal end of an arm 34 mounted on an arm support section 33) brought into contact with the magnetic recording medium 1, the magnetic recording medium 1 was rotated by using a spindle motor 32 mounted on a support section 31, the ball 35 was moved at a circumferential speed of 25 mm/s, and a breaking point of the lubricating layer was observed. More specifically, a friction coefficient between the magnetic recording medium 1 and the ball 35 was measured with a load cell 36 mounted on the arm 34, and the number of cycles at a point of time in which a rapid change (breaking sign 61) in the friction coefficient occurred, as shown in FIG. 6, was taken as a breaking point 62. In this evaluation, it can be determined that good lubricating layer with high durability is obtained when the appearance of the breaking point 62 is delayed. The results obtained are shown in Table 3 and FIG. 7.

TABLE 3

Evaluation of flying height

| | Lubricant material | Total film thickness (A) | ADOH film thickness (A) | Breaking point (cycles) |
|---|---|---|---|---|
| Comparative Example 1 | Fomblin Z-tetraol + ADOH | 8.29 | 2.31 | 284.5 |
| Comparative Example 2 | D4OH | 9.21 | 0.00 | 266.2 |
| Example 1 | D4OH + ADOH | 9.07 | 0.32 | 350.8 |
| | D4OH + ADOH | 8.48 | 0.79 | 420.1 |
| | D4OH + ADOH | 8.72 | 1.43 | 526.0 |
| | D4OH + ADOH | 9.08 | 3.02 | 600.1 |
| | D4OH + ADOH | 7.49 | 1.51 | 458.6 |
| | D4OH + ADOH | 7.69 | 2.86 | 510.3 |
| | D4OH + ADOH | 9.42 | 1.48 | 607.2 |
| | D4OH + ADOH | 6.51 | 1.46 | 414.6 |
| | D4OH + ADOH | 6.11 | 3.05 | 430.2 |

Figure 7:
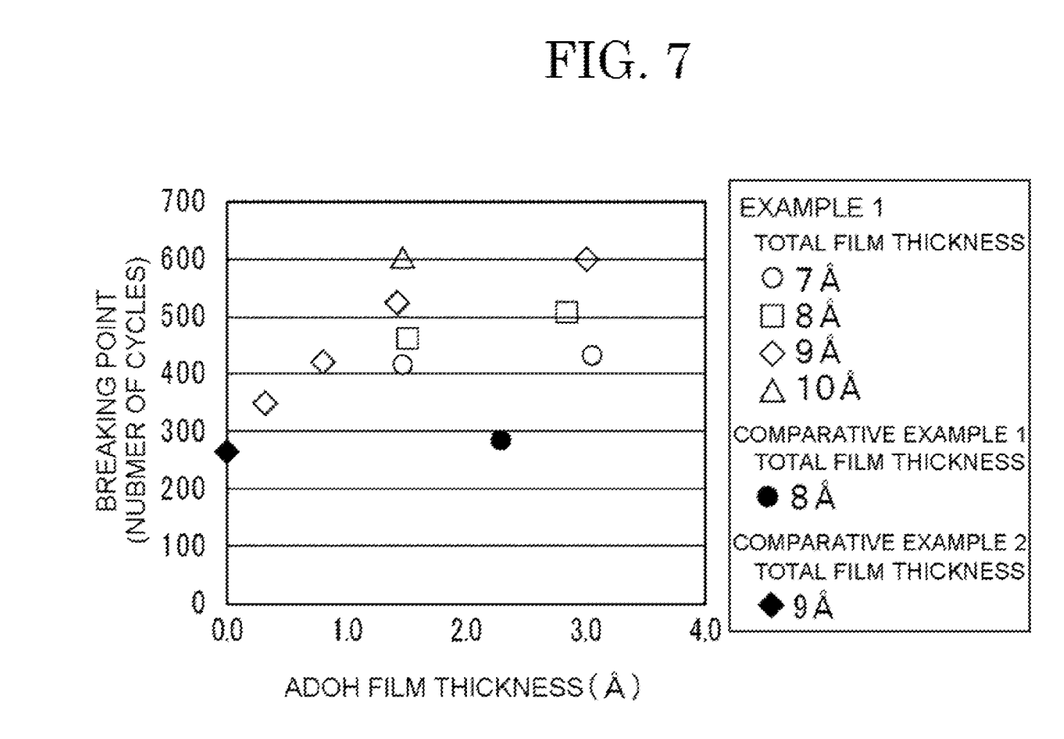
FIG. 7 is a graph showing the relationship between the added amount of ADOH and the breaking point in Example 1, Comparative Example 1, and Comparative Example 2.

The results in Table 3 and FIG. 7 indicate that the mixed sample of D4OH and ADOH of Example 1 had a higher breaking point and durability is higher than those of the mixed sample of Fomblin (trade name) Z-tetraol and ADOH of Comparative Example 1. Further, the comparison of the mixed sample of D4OH and ADOH of Example 1 and the D4OH sample of Comparative Example 2 demonstrated that the addition of ADOH is effective in terms of improving durability. Further, the comparison of the samples of Example 1 demonstrates that durability increases with the increase in the added amount of ADOH. The comparison of the samples of Example 1 also indicates that durability depends on the total film thickness and increases with the increase in total film thickness.

The above-described results demonstrate that the lubricating layer in accordance with the present invention that is constituted by a mixture of D4OH having the structure represented by Formula (1) and ADOH having the structure represented by Formula (II) makes it possible to reduce the head flying height by comparison with that of the lubricating layer constituted by the generally used mixture of Fomblin (trade name) Z-tetraol and ADOH. Therefore, it is apparent that the lubricating layer in accordance with the present invention is extremely effective means for reducing a gap between a head and a magnetic recording medium and providing a magnetic recording medium having a better electromagnetic conversion property. Furthermore, it is determined that durability of the lubricating layer is greatly increased by the addition of ADOH by comparison with that in the case in which only D4OH is used. Thus, it is clear that by optimizing the added amount of ADOH it is possible to decrease the head flying height and increase durability of the lubricating layer.

The invention claimed is:

1. A magnetic recording medium, comprising:
   a nonmagnetic substrate provided on which are, in the order recited;
   an underlayer;
   a magnetic layer;
   a protective layer comprised of carbon; and
   a lubricating layer comprised of:
      a lubricant mixture comprising a lubricant represented by Formula (I) below $R_f = \text{—}R^1\text{—}O(CF_2CF_2CF_2O)_m\text{—}R^2\text{—}$, where m is an integer equal to or greater than 1, and $R^1$ and $R^2$ are divalent straight chains consisting of both $-CH_2 CF_2-$ or both $-CH_2 CF_2CF_2-$; and
a lubricant represented by Formula (II) below $R_{f2} = \text{—}CH_2CF_2O(CF_2CF_2O)_p(CF_2O)_qCF_2CH_2\text{—}$, where p and q are integers equal to or greater than 0, provided that p=q=0 is excluded.

2. A method of manufacturing a magnetic recording medium, comprising, in the order recited:
   forming an underlayer on a non-magnetic substrate;
   laminating a magnetic layer on the underlayer;
   laminating a protective layer comprised of carbon on the magnetic layer; and
   forming a lubricating layer by laminating a lubricant mixture on the protective layer that is comprised of:
   a lubricant represented by Formula (I) below $R_f = \text{—}R^1\text{—}O(CF_2CF_2CF_2O)_m\text{—}R^2\text{—}$, where m is an integer equal to or greater than 1, and $R^1$ and $R^2$ are divalent straight chains consisting of both $-CH_2 CF_2-$ or both $-CH_2 CF_2CF_2$; and
a lubricant represented by Formula (II) below $R_{f2} = \text{—}CH_2CF_2O(CF_2CF_2O)_p(CF_2O)_qCF_2CH_2\text{—}$, where p and q are integers equal to or greater than 0, provided that p=q=0 is excluded.

3. A method for reducing flying height of a head and improving an electromagnetic conversion property in a magnetic recording medium, comprising:
   providing the magnetic recording medium according to claim 1; and
   changing at least one of a usage amount of the lubricant represented by Formula (I) and a mixing ratio of the lubricant represented by Formula (I) and the lubricant represented by Formula (II).

4. The magnetic recording medium according to claim 1, wherein the underlayer is provided on the nonmagnetic substrate, the magnetic layer is provided on the underlayer, the protective layer is provided on the magnetic layer, and the lubricating layer is provided on the protective layer.

5. The magnetic recording medium according to claim 1, wherein $R^1$ is $-CH_2 CF_2CF_2-$ and $R^2$ is $-CF_2CF_2 CH_2-$.

6. The magnetic recording medium according to claim 1, wherein $R^1$ is $-CH_2 CF_2-$ and $R^2$ is $-CF_2 CH_2-$.

7. The method of manufacturing a magnetic recording medium according to claim 2, wherein $R^1$ is $-CH_2 CF_2CF_2-$ and $R^2$ is $-CF_2CF_2 CH_2-$.

8. The method of manufacturing a magnetic recording medium according to claim 2, wherein $R^1$ is $-CH_2 CF_2-$ and $R^2$ is $-CF_2 CH_2-$.

* * * * *